United States Patent
Sam et al.

(10) Patent No.: US 9,922,233 B1
(45) Date of Patent: Mar. 20, 2018

(54) THIN TYPE OPTICAL FINGERPRINT SENSOR

(71) Applicant: IDspire Corporation Ltd., New Taipei (TW)

(72) Inventors: Ri Mun Sam, New Taipei (TW); Yung Hsien Yang, New Taipei (TW)

(73) Assignee: IDSPIRE CORPORATION LTD., New Taipei (TW)

( * ) Notice: Subject to any disclaimer, the term of this patent is extended or adjusted under 35 U.S.C. 154(b) by 0 days.

(21) Appl. No.: 15/255,184

(22) Filed: Sep. 2, 2016

(51) Int. Cl.
*G06K 9/00* (2006.01)

(52) U.S. Cl.
CPC .................. *G06K 9/00046* (2013.01)

(58) Field of Classification Search
CPC .......... G06K 9/00045; G06K 9/00084; G06K 9/00019; G06K 9/00026; G06K 9/00065; G06K 9/00013; G06K 9/00046; G07C 9/00158; G07C 9/00087; A61B 5/1172
See application file for complete search history.

(56) References Cited

U.S. PATENT DOCUMENTS

| | | | | |
|---|---|---|---|---|
| 4,385,831 A * | 5/1983 | Ruell | ................... | A61B 5/1172 356/71 |
| 4,428,670 A * | 1/1984 | Ruell | ................... | A61B 5/1172 356/445 |
| 5,109,428 A * | 4/1992 | Igaki | ................... | A61B 5/1172 356/71 |
| 5,892,599 A * | 4/1999 | Bahuguna | .......... | G06K 9/00046 356/71 |
| 2003/0053228 A1* | 3/2003 | Lee | ........................ | A61B 5/103 359/860 |
| 2006/0215887 A1* | 9/2006 | Nishimura | ........... | G06K 9/0012 382/124 |
| 2009/0278810 A1* | 11/2009 | Ma | ........................ | G06F 3/0412 345/173 |
| 2010/0303311 A1* | 12/2010 | Shin | ................... | G06K 9/00013 382/124 |

* cited by examiner

*Primary Examiner* — Amir Alavi
(74) *Attorney, Agent, or Firm* — Bacon & Thomas, PLLC

(57) ABSTRACT

A thin optical fingerprint sensor, including: a shell; an optical prism arranged in the shell with a collection surface arranged on the top of the optical prism, a basal plane corresponding to the collection surface and situated on the bottom of the optical prism, a mirror surface arranged on one end of the optical prism, and an output surface arranged on another end of the optical prism; a flexible circuit board, the shell being arranged on the flexible circuit board; a light source arranged on the flexible circuit board, the light source being corresponding to the basal plane of the optical prism; and an image sensing unit arranged on the flexible circuit board in correspondence to the output surface of the optical prism.

10 Claims, 5 Drawing Sheets

THIN TYPE OPTICAL FINGERPRINT SENSOR

BACKGROUND OF THE INVENTION

Field of the Invention

The invention is a thin type optical fingerprint sensor, particularly, which can be used for fingerprint collection recognition.

Descriptions of the Related Art

Typically, a conventional optical fingerprint image acquisition device may be composed of a prism, a convex lens, an image sensor and a light source generally, in which the prism is arranged as an inverted triangle, the convex lens corresponds to a first side of the prism, the image sensor is in correspondence with the convex lens, and the light source corresponds to a second side of the prism.

In use, an operator is allowed to place fingerprint on a third side of the prism while the light source performs irradiation from the second side of the prism and light rays are reflected to the first side of the prism by a fingerprint image, and in turn, the light rays enter the convex lens, followed by focusing on the image sensor to, thereby, perform fingerprint collection recognition.

However, for the above conventional optical fingerprint image acquisition device, the volume of the prism thereof is usually constrained to shape and cannot be reduced, so that it cannot be employed on current compact electronic devices effectively.

In order to overcome the disadvantages of conventional optical fingerprint image acquisition devices, related patents are proposed, such as P.R.O.C. invention patent publication No. CN101034437A, entitled "Fingerprint Collecting Method and High-Resolution Thin Type Fingerprint Collector", which recognized existing issues of related art, including small acquisition and poor definition in existing field. For its device, an inclined plane is resulted by cutting out the corner side of the prism, a light source is disposed near the inclined plane, light rays emitted from the light source are irradiated onto a basal plane below the prism through the corner side of the prism, fingerprint reflection on the basal plane below the prism is projected onto a photoelectric detector through reflection from the prism. The photoelectric detector is arranged on the back side of the prism, a reflector surface is disposed on the ramp lumbar of the prism, a viewfinder is arranged obliquely outside the lens, the photoelectric detector is above the viewfinder, characterized in that the light source is disposed on lateral of the prism, advantageous of larger fingerprint reflector, a greater acquisition area and high definition are proposed.

The light enters the prism, followed by outputting to the photoelectric detector with reflection for reducing a single optical path to reduce the volume of the fingerprint collection device in the patents mentioned above. Such an approach may improve shortages of related optical fingerprint image acquisition devices. However, such conventional fingerprint image acquisition device still cannot comply with current electronic devices that are thinned increasingly. Therefore, such various conventional products are still insufficient in practical applications.

In view of this, the inventor of the present invention has researched and developed a thin type optical fingerprint sensor with efforts in order to improve various shortages of above prior arts by reducing thickness of the prism further.

SUMMARY OF THE INVENTION

One main objective of the invention is such that a light source is disposed on a basal plane of an optical prism for an operator to put a fingerprint on a collection surface, so that light sources of luminous elements are input through the basal plane of the prism and irradiated onto the fingerprint, and light rays are reflected by a mirror surface of the optical prism, after that, an output surface acts as an output for the reflected light rays for an image sensing unit to receive the light rays and form a fingerprint image, in order to achieve effects of reducing volume of the optical fingerprint sensor and increasing resolution of the fingerprint image.

In order to achieve the above objective, a preferred embodiment of a thin type optical fingerprint sensor of the invention includes: a shell; an optical prism arranged in the shell, the optical prism comprising a collection surface arranged on an uppermost part, a basal plane corresponding to the collection surface and situated on a lowermost part of the optical prism, a mirror surface arranged on one end of the optical prism, and an output surface arranged on another end of the optical prism; a flexible circuit board, the shell being arranged on the flexible circuit board; a light source arranged on the flexible circuit board, the light source being corresponding to the basal plane of the optical prism; and an image sensing unit arranged on the flexible circuit board in correspondence to the output surface of the optical prism; wherein light rays emitted from the light source enter the optical prism through the basal plane, and are reflected by a fingerprint put on the collection surface to form an image beam, the image beam being reflected by the mirror surface and then entering the image sensing unit through the output surface.

In the preferred embodiment, the shell is provided with an accommodation portion for containing the optical prism, the bottom of the accommodation portion being provided with multiple through-holes.

In the preferred embodiment, there are a first included angle between the mirror surface and the collection surface of the optical prism, a second included angle between the mirror surface and the basal plane, a third included angle between the output surface and the collection surface, and a fourth included angle between the output surface and the basal plane.

In the preferred embodiment, the first included angle is 75~85 degrees, the second included angle is 95~105 degrees, the third included angle and the fourth included angle are 90 degrees for the optical prism.

In the preferred embodiment, the optical prism is made of transparent material, such as glass, plastic, quartz or crystal etc.

In the preferred embodiment, the flexible circuit board is provided with a light source, at least one resistor and an image sensing unit thereon.

In the preferred embodiment, the light source comprises several LED luminous elements, which are disposed in those through-holes of the shell, respectively.

In the preferred embodiment, those LED luminous elements are arranged as matrix of luminous elements, which are disposed such that a light refraction angle of the optical prism is within a critical angle.

In the preferred embodiment, the image sensing unit comprises a lens arranged on an output surface corresponding to the optical prism; a reflection mirror arranged on an inner surface of an inclined plane in front of the shell; and an image sensing receiver arranged beneath the reflection mirror.

BRIEF DESCRIPTION OF THE DRAWINGS

FIG. 5-1 is a reference drawing for illustration of principle of the invention.

FIG. 5-2 is a schematic diagram showing irradiation of a conventional light source.

FIG. 5-3 is a schematic diagram showing irradiation of a light source of the invention.

DETAILED DESCRIPTION OF THE PREFERRED EMBODIMENT

Figure 1:
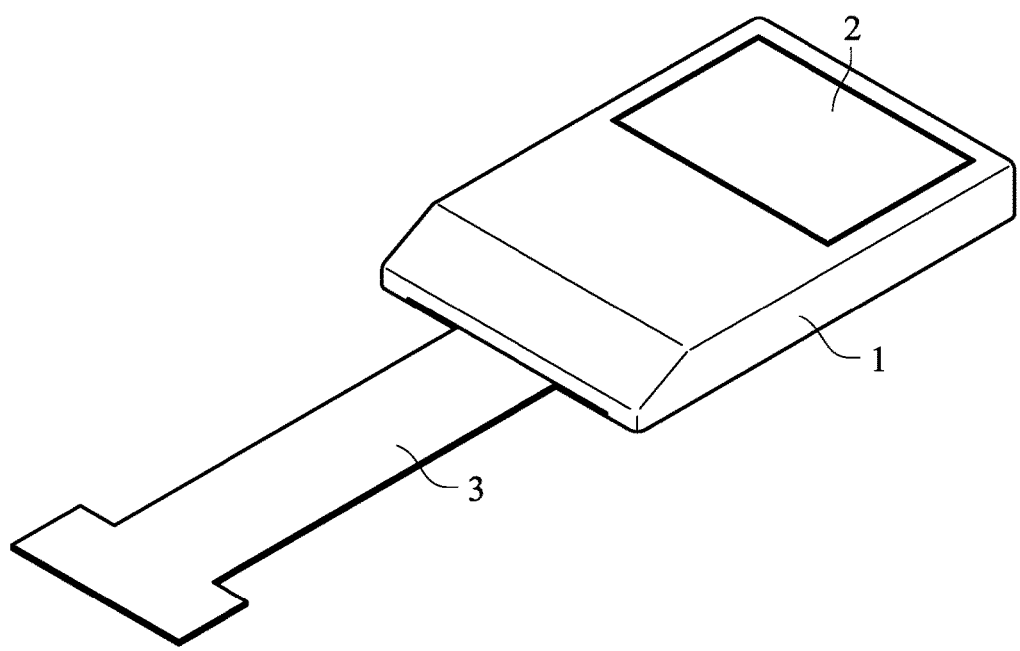
FIG. 1 is a perspective appearance schematic diagram of the invention.

The invention is illustrated in detail as following by means of a preferred embodiment below in connection with appended drawings for thorough understanding of objectives, features and advantages of the invention.

Refer to FIGS. 1, 2, 3 and 4, which are a perspective appearance schematic diagram of the invention, a perspective element exploded schematic diagram of the invention, a schematic diagram of an optical path of the invention in operation and a schematic diagram showing a prism of the invention, respectively. As shown in the figures, the invention is a thin type optical fingerprint sensor, including a shell 1, an optical prism 2, a flexible circuit board 3, a light source 4, a resistor 5 and an image sensing unit 6.

Figure 2:
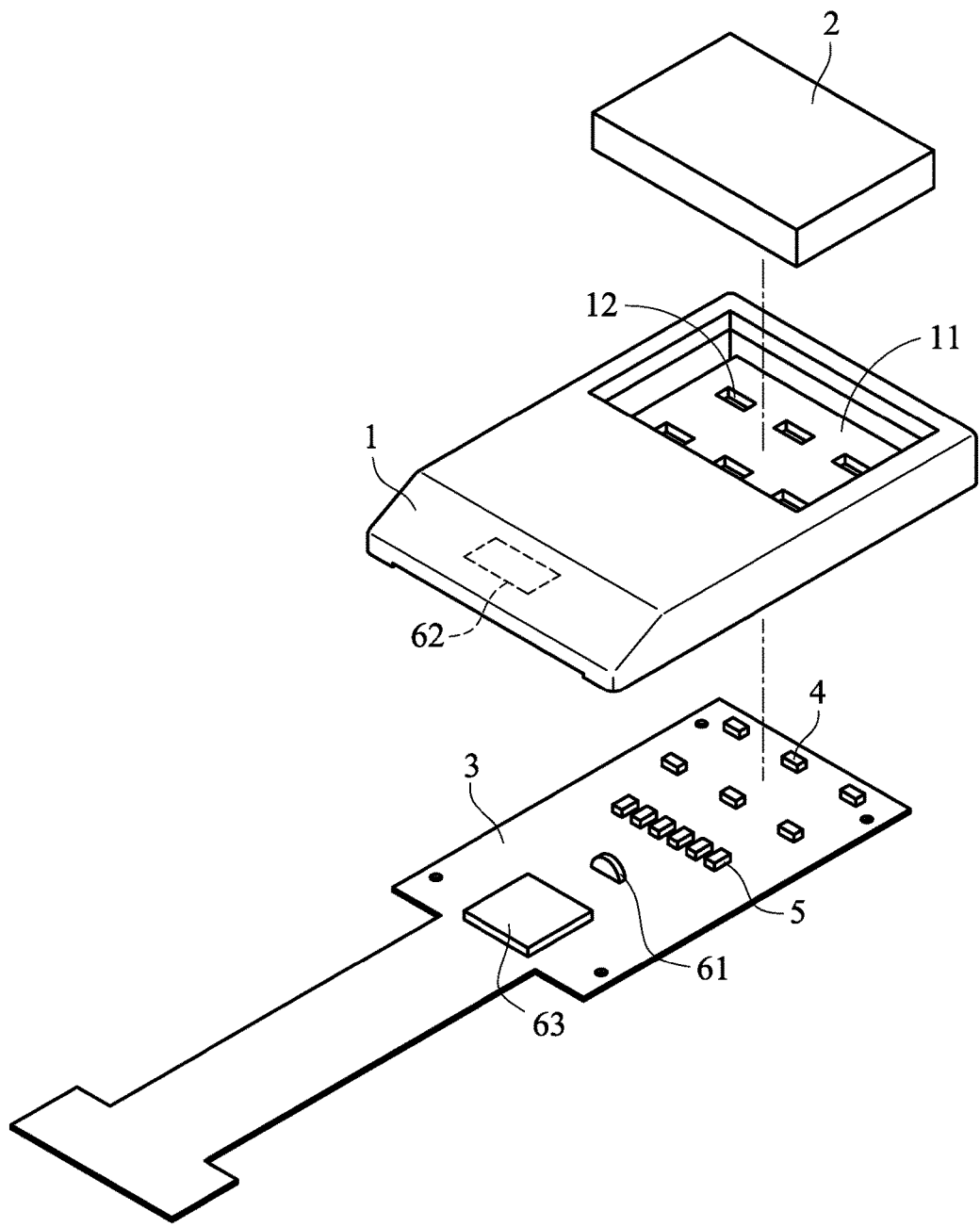
FIG. 2 is a perspective element exploded schematic diagram of the invention.

As shown in FIG. 2, in a preferred embodiment of the invention, the shell 1 has an accommodation portion 11 in a shape of recession capable of containing the optical prism 2. The bottom of the accommodation portion 11 is provided with six through-holes 12 thereon for the light source 4 composed of six LED luminous elements to be installed. Six light sources 4 are disposed on the flexible circuit board 3. The light sources 4 correspond to a basal plane 22 of the optical prism 2. The flexible circuit board 3 is disposed on the bottom of the shell 1. The shell 1 is mounted on the flexible circuit board 3 for the six light sources 4 to be situated in the respective through-holes 12. In the preferred embodiment, the light source 4 comprises 2 ranks of LED luminous elements, each rank of luminous elements having 3 LED luminous elements; multiple resistors 5 being arranged on the flexible circuit board 3 in a power control circuit for adjusting each of the LED luminous elements. The image sensing receiver 6, which is disposed on one side of the flexible circuit board 3 opposite to the light source 4, comprises a lens 61 arranged in front of an output surface 24 of the optical prism 2; a reflection mirror 62 arranged on an inner surface of an inclined plane in front of the shell 1; and an image sensing receiver 63 arranged beneath the reflection mirror 62.

Figure 3:
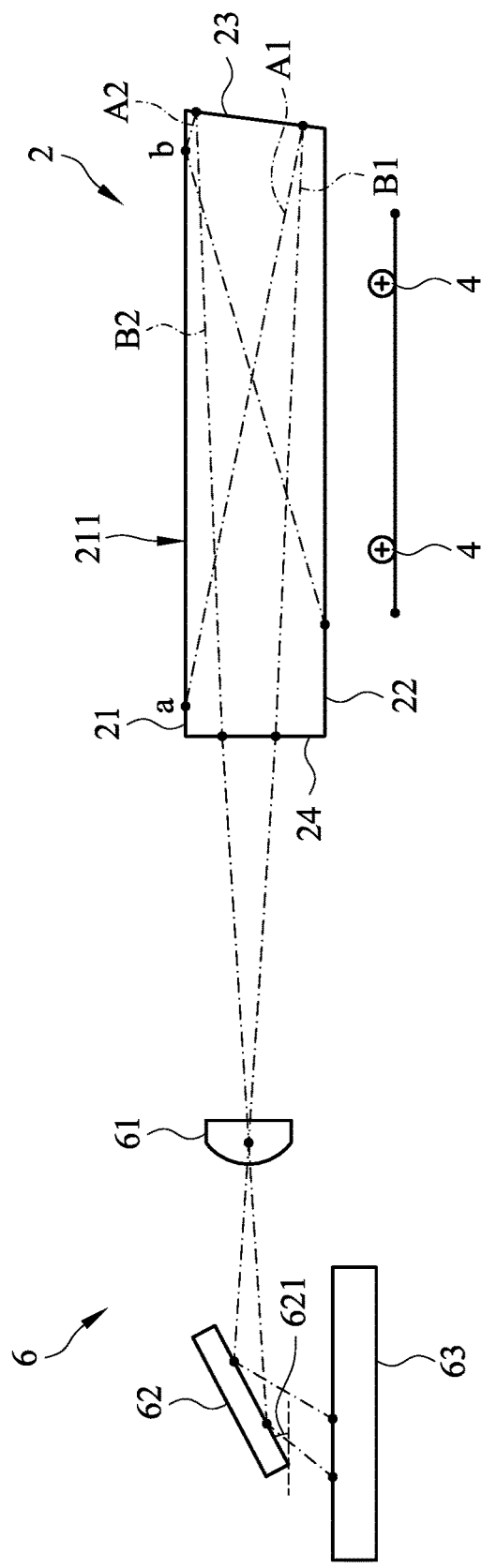
FIG. 3 is a schematic diagram showing an optical path of the invention in operation.

Refer to FIG. 3, in operation, the light rays emitted from the light source 4 enter the prism through the basal plane 22 of the optical prism 2, and are reflected by the fingerprint put on a collection surface 21 to form an image beam, which is reflected by a mirror surface 23 of the optical prism 2, followed by entering the image sensing unit 6 through the output surface 24.

Figure 4:
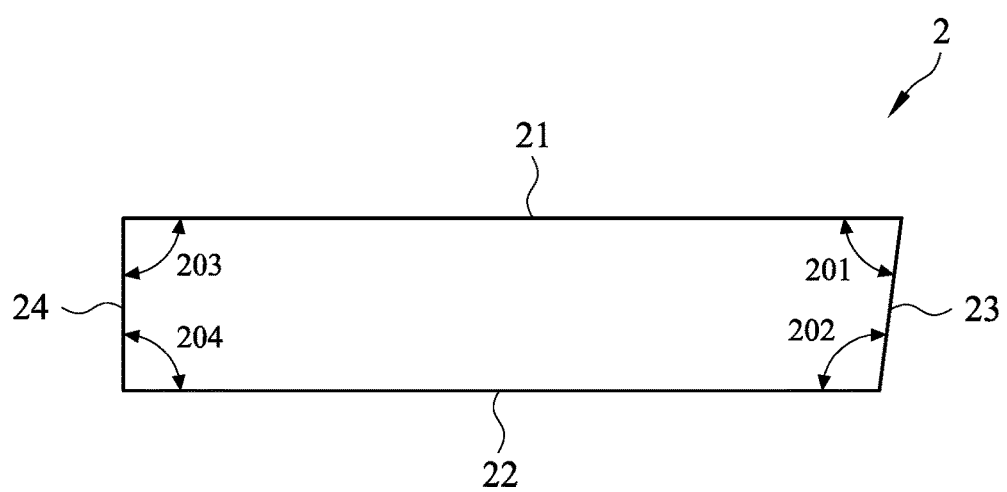
FIG. 4 is a schematic diagram showing a prism of the invention.

Refer to FIGS. 3 and 4, the optical prism 2 comprises a collection surface 21 with a fingerprint placement zone 211 arranged on the top of the optical prism 2, a basal plane 22 corresponding to the collection surface 21 is situated on the bottom of the optical prism 2, a mirror surface 23 arranged on one end of the optical prism 2, and an output surface 24 arranged on another end of the optical prism 2, there being a first included angle 201 between the mirror surface 23 and the collection surface 21, a second included angle 202 between the mirror surface 23 and the basal plane 22, a third included angle 203 between the output surface 24 and the collection surface 21, and a fourth included angle 204 between the output surface 24 and the basal plane 22 of the optical prism 2. As the optical prism 2 is installed in the accommodation portion 11, the light source 4 faces the basal plane 22 of the optical prism 2. The light rays emitted from the light source 4 enter the optical prism 2 through the basal plane 22 and are irradiated onto the fingerprint (not shown) put on the fingerprint placement zone 211 of the collection surface 21. The light rays emitted from the light source 4 form a first incident ray A1 on a left endpoint a and a second incident ray A2 on a right endpoint b for the fingerprint placement zone 211 by means of bumpy texture of the fingerprint, followed by being reflected from the mirror surface 23 to form a first reflected ray B1 and a second reflected ray B2. Light rays B1, B2 leave the optical prism 2 from the output surface 24 and converged through the lens 61, followed by being reflected to the image sensing receiver 63 by the reflection mirror 62. With disposition of the reflection mirror 62, volume of the image sensing receiver 6 may be reduced, while image resolution may be increased. In the preferred embodiment, a tilt angle 621 of the reflection mirror 62 has an angle of 20~40 degrees, the image sensing receiver 63 is a CMOS.

As shown in FIG. 4, the first included angle 201 is an acute angle, the second included angle 202 is an obtuse angle, and the third included angle 203 and the fourth included angle 204 are an appropriate angle for the optical prism 2, such that the light rays emitted from the light source 4 perform the optical path described above. Preferably, in the embodiment, the first included angle 201 is 75~85 degrees, the second included angle 202 is 95~105 degrees, the third included angle 203 and the fourth included angle 204 are both 90 degrees; the optical prism 2 is made of transparent material, such as glass, plastic, quartz or crystal etc.

Figures 1, 5:
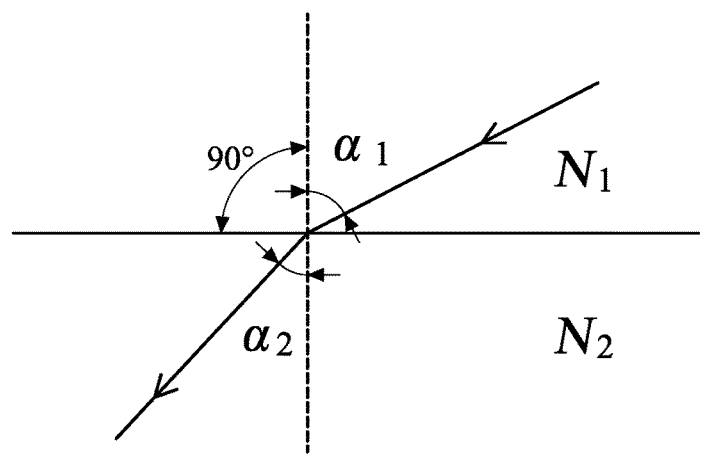
Figures 2, 5:
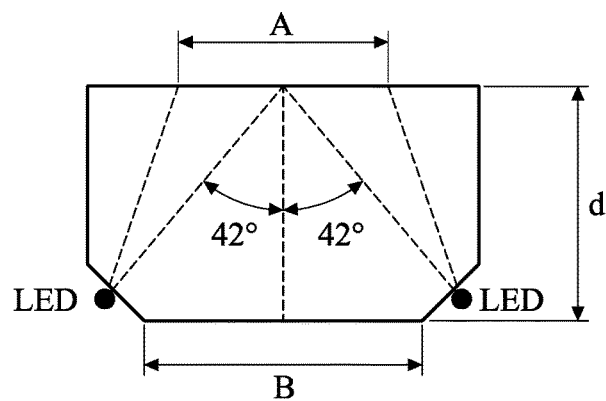
Figures 3, 5:
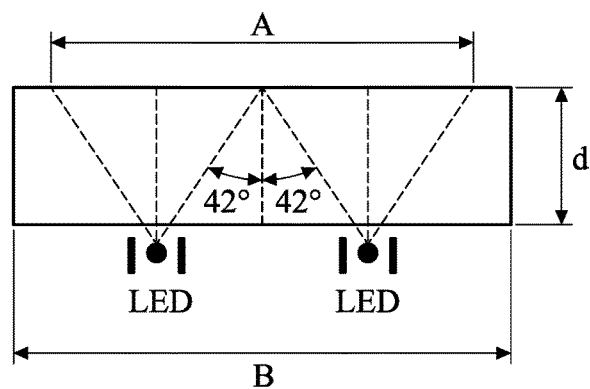

Refer to FIGS. 5-1, 5-2 and 5-3, which are a reference drawing for illustration of principle of the invention, a schematic diagram showing irradiation of a conventional light source and a schematic diagram showing irradiation of a light source of the invention, respectively. As shown in FIG. 5-1, as light slants from one medium into another medium, angle of light ray changes, which is related to the refraction indices of the media. As shown in the figure, a normal line perpendicular to an interface of a first medium and a second medium is indicated. Total reflection occurs as angle of refraction ray with respect to the normal line reaches a certain threshold angle. Wherein, N1 indicates refraction index of the first medium, N2 indicates refraction index of the second medium, $\alpha 1$ indicates incident angle of the first medium, $\alpha 2$ indicates refraction angle of the second medium. In the preferred embodiment, N1=1 as the first medium is air, the medium for N2 may be of transparent material, such as glass, plastic, quartz or crystal etc., which refraction index is approximate N2=1.5. Incident angles and refraction angles of two different media are substituted into the equation as following:

$$N1 \sin \alpha1 = N2 \sin \alpha2$$

α2=42° is obtained as N1=1, α1=90° and N2=1.5 are substituted into the equation above. As α2 exceeds 42° from 0°, α1 exceeds 90°, while total reflection occurs in medium 2, where α2=42° is a critical angle. That is, the refracted light passing through the optical prism 2 can be emitted outside the prism and perform light source required by fingerprint collection zone 211 only when α2=0° ~α2=42°.

As shown in FIG. 5-2, conventional device for light source irradiation is such that an inclined plane is cut out on a corner side of the prism, and the light source is disposed in an irradiation port formed on the inclined plane. For the principle of dark background fingerprint collection of the device, LED performs irradiation in a direction such that an angle between the fingerprint collection surface and the vertical line thereof is 42 degrees, so that a dark background surface is formed when the light rays pass through the fingerprint collection surface. Texture of fingerprint due to finger contact with the collection surface generates reflection to form white fingerprint texture in the dark background. If light rays are to be irradiated onto the fingerprint collection surface from two corner sides of the prism with 42 degrees, the thickness d of the prism has to be larger than half of the width A of the fingerprint collection surface, i.e., d>A/2 (the thickness d of the prism is larger than ½ of the width A of the fingerprint collection surface).

As shown in FIG. 5-3, for the irradiation mode of the invention, two ranks of LED light sources 4 are disposed on the basal plane of the optical prism 2 to form irradiation rages in respective directions such that both angles of 42 degrees are included between the fingerprint collection surface and the vertical line thereof. By means of such irradiation mode, the thickness d of the optical prism 2 may be reduced to be a quarter of the width A of the fingerprint collection surface, i.e., d=¼A.

Refer to FIG. 2, total 6 LED light sources arranged in the two ranks of the invention perform irradiation only in respective effective ranges, i.e., ⅙ of area of the fingerprint collection surface A; each LED luminous element gives refracted light of 0~42 degrees. These refracted light may be transmitted from the prism to form the dark background surface B. As shown in 5-3, by means of the light source arrangement of the invention, each LED light source irradiates the fingerprint collection surface with 42° from both sides of the prism, such that the refraction angle of light for the optical prism is within the critical angle for generation of total reflection, such that the width A of the fingerprint collection surface achieves four times of the thickness d of the prism. Therefore, the invention allows the thickness d of the prism to become smaller than the width A of the fingerprint collection surface in order to effectively thinning the fingerprint collector.

The thin type optical fingerprint sensor of the invention has a larger area for fingerprint collection, such that the thickness of the prism becomes smaller than the width of the fingerprint collection surface, so that all fingerprint collection devices with effective area for fingerprint collection between 6*6 millimeters to 60*60 millimeters (mm) can be employed to achieve the advantages of reducing thickness of the optical prism, being applicable to various fingerprint collection areas, and increasing resolution of fingerprint image.

It is noted that the above description is only a preferred embodiment of the invention and all equivalent modification according to the claims of the invention shall be within the substantial scope of the invention.

What is claimed is:

1. A thin type optical fingerprint sensor, including:
   a shell;
   an optical prism arranged in the shell, the optical prism comprising a collection surface arranged on the top of the optical prism, a basal plane corresponding to the collection surface and situated on the bottom of the optical prism, a mirror surface arranged on one end of the optical prism, and an output surface arranged on another end of the optical prism;
   a flexible circuit board, the shell being arranged on the flexible circuit board;
   a light source arranged on the flexible circuit board, the light source being corresponding to the basal plane of the optical prism;
   a resistor arranged on the flexible circuit board; and
   an image sensing unit corresponding to the output surface of the optical prism, wherein light rays emitted from the light source enter the optical prism through the basal plane of the optical prism, and are reflected by a fingerprint put on the collection surface to form an image beam, the image beam being reflected by the mirror surface and then entering the image sensing unit through the output surface.

2. The thin type optical fingerprint sensor as claim 1, wherein the shell is provided with an accommodation portion for containing the optical prism, the bottom of the accommodation portion being provided with multiple through-holes.

3. The thin type optical fingerprint sensor as claim 1, wherein there are a first included angle between the mirror surface and the collection surface of the optical prism, a second included angle between the mirror surface and the basal plane, a third included angle between the output surface and the collection surface, and a fourth included angle between the output surface and the basal plane.

4. The thin type optical fingerprint sensor as claim 3, wherein the first included angle is 75~85 degrees, the second included angle is 95~105 degrees, the third included angle and the fourth included angle are 90 degrees for the optical prism.

5. The thin type optical fingerprint sensor as claim 1, wherein the optical prism is made of transparent material, such as glass, plastic, quartz or crystal etc.

6. The thin type optical fingerprint sensor as claim 1, wherein the flexible circuit board is provided with a light source, at least one resistor and an image sensing unit thereon.

7. The thin type optical fingerprint sensor as claim 1, wherein the light source comprises several LED luminous elements, which are disposed in those through-holes of the shell, respectively.

8. The thin type optical fingerprint sensor as claim 7, wherein the LED luminous elements are arranged as matrix of luminous elements, which are disposed such that a light refraction angle of the optical prism is within a critical angle.

9. The thin type optical fingerprint sensor as claim 1, wherein the image sensing unit comprises a lens arranged on an output surface corresponding to the optical prism; a reflection mirror arranged on an inner surface of an inclined plane in front of the shell; and an image sensing receiver arranged beneath the reflection mirror.

10. The thin type optical fingerprint sensor as claim 9, wherein a tilt angle of the reflection mirror has an angle of 20~40 degrees.

\* \* \* \* \*